(12) United States Patent
Yetter et al.

(10) Patent No.: US 7,401,404 B2
(45) Date of Patent: Jul. 22, 2008

(54) RETAINER GASKET CONSTRUCTION

(75) Inventors: William P. Yetter, Chula Vista, CA (US); Douglas C. Schenk, Chula Vista, CA (US); Darrell W. Rall, Garden Grove, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 400 days.

(21) Appl. No.: 10/900,139

(22) Filed: Jul. 27, 2004

(65) Prior Publication Data

US 2005/0044689 A1    Mar. 3, 2005

Related U.S. Application Data

(60) Provisional application No. 60/497,777, filed on Aug. 26, 2003.

(51) Int. Cl.
*B21D 53/84* (2006.01)
*F02F 11/00* (2006.01)

(52) U.S. Cl. .............. 29/888.3; 29/469.5; 29/527.1; 29/527.2; 277/313; 277/591; 277/596; 72/376

(58) Field of Classification Search ............. 29/888.3, 29/527.1, 527.2, 469.5; 73/325, 376, 379.2; 277/313, 591, 596, 572, 575, 586, 587
See application file for complete search history.

(56) References Cited

U.S. PATENT DOCUMENTS 2,192,739 A    3/1940    Goetze
2,200,212 A    5/1940    Bohmer, Jr. et al.
2,269,486 A    1/1942    Santoro
2,339,478 A    1/1944    Hoheisel
2,339,479 A    1/1944    McCreary
2,513,178 A    6/1950    Jackson
2,532,891 A    12/1950   Chupp
2,576,673 A    11/1951   Cole
2,679,241 A    5/1954    Dickson
2,795,444 A    6/1957    Nenzell
2,857,184 A    10/1958   Mancusi, Jr.
2,882,083 A    4/1959    Palumbo et al.
2,900,199 A    8/1959    Logan (Continued)

FOREIGN PATENT DOCUMENTS

EP    0 394 145    10/1993

(Continued)

OTHER PUBLICATIONS

Copy of Notification of Transmittal of the International Search Report and the Written Opinion of the International Searching Authority, or the Declaration in International Application No. PCT/US04/028679.

(Continued)

*Primary Examiner*—Essama Omgba
(74) *Attorney, Agent, or Firm*—John A. Molnar, Jr.

(57) ABSTRACT

Sealing gasket construction for providing a fluid seal intermediate a pair of opposed, mating parts or structures. The gasket includes a metal retainer and a resilient seal element received in a groove formed into the retainer. Such groove is adapted to be fabricated by coining or a like sheet metal stamping or forming process.

17 Claims, 9 Drawing Sheets

U.S. PATENT DOCUMENTS

| | | | |
|---|---|---|---|
| 2,914,350 A | 11/1959 | Smith | |
| 3,061,321 A | 10/1962 | Smith | |
| 3,167,322 A | 1/1965 | Aichroth | |
| 3,195,906 A | 7/1965 | Moyers | |
| 3,215,442 A | 11/1965 | Papenguth | |
| 3,231,289 A | 1/1966 | Carrell | |
| 3,259,404 A | 7/1966 | Papenguth | |
| 3,302,953 A | 2/1967 | Glasgow | |
| 3,404,061 A | 10/1968 | Shane et al. | |
| 3,462,161 A | 8/1969 | Daubenberger et al. | |
| 3,472,533 A | 10/1969 | Turner | |
| 3,524,662 A | 8/1970 | Tolman et al. | |
| 3,578,346 A | 5/1971 | Jelinek | |
| 3,635,067 A | 1/1972 | Hanas | |
| 3,635,480 A | 1/1972 | Bain et al. | |
| 3,671,046 A | 6/1972 | Hagmann | |
| 3,720,420 A | 3/1973 | Jelinek et al. | |
| 3,737,169 A | 6/1973 | Glynn | |
| 3,746,348 A | 7/1973 | Stone | |
| 3,871,668 A | 3/1975 | Coker et al. | |
| 4,026,565 A | 5/1977 | Jelinek | |
| 4,081,083 A | 3/1978 | Glauser et al. | |
| 4,174,846 A | 11/1979 | Scott | |
| 4,272,109 A | 6/1981 | Ahlstone | |
| 4,294,477 A | 10/1981 | Ahlstone | |
| 4,300,773 A | 11/1981 | Jelinke | |
| 4,305,595 A | 12/1981 | Miyagishima et al. | |
| 4,537,406 A | 8/1985 | Hirasuna et al. | |
| 4,625,978 A | 12/1986 | Jelinek | |
| 4,676,515 A | 6/1987 | Cobb | |
| 4,679,831 A | 7/1987 | Kielminski | |
| 4,690,438 A | 9/1987 | Kanszarek | |
| 4,711,474 A | 12/1987 | Patrick | |
| 4,738,606 A * | 4/1988 | Christiansen et al. | 425/127 |
| 4,802,698 A | 2/1989 | Fujisawa et al. | |
| 4,824,357 A * | 4/1989 | Christiansen | 425/417 |
| 4,872,712 A | 10/1989 | Maier | |
| 5,011,162 A | 4/1991 | Jelinek | |
| 5,033,189 A * | 7/1991 | Desverchere et al. | 29/888.3 |
| 5,105,777 A | 4/1992 | Kronich et al. | |
| 5,267,740 A | 12/1993 | Stritzke | |
| 5,316,320 A | 5/1994 | Breaker | |
| 5,421,594 A | 6/1995 | Becerra | |
| 5,427,386 A | 6/1995 | Breaker | |
| 5,511,797 A | 4/1996 | Nikirk et al. | |
| 5,518,257 A | 5/1996 | Breaker | |
| 5,518,280 A | 5/1996 | Mann | |
| 5,564,715 A | 10/1996 | Wallace | |
| 5,570,501 A * | 11/1996 | Atkinson et al. | 29/527.2 |
| 5,727,795 A * | 3/1998 | Plunkett | 277/601 |
| 5,823,542 A | 10/1998 | Owen | |
| 5,890,719 A | 4/1999 | Bettencourt | |
| 5,938,246 A | 8/1999 | Wallace et al. | |
| 5,944,319 A | 8/1999 | Kohlman | |
| 5,944,322 A | 8/1999 | Coff et al. | |
| 6,231,050 B1 * | 5/2001 | Raden | 277/598 |
| 6,357,758 B1 * | 3/2002 | Zurfluh | 277/595 |
| 6,361,052 B1 | 3/2002 | Farinella | |
| 6,371,489 B1 | 4/2002 | Combet et al. | |
| 6,390,479 B1 | 5/2002 | Combet et al. | |
| 6,419,237 B1 | 7/2002 | More | |
| 6,460,859 B1 | 10/2002 | Hammi et al. | |
| 6,553,664 B1 * | 4/2003 | Schenk | 29/888.3 |
| 6,598,883 B1 | 7/2003 | Hammi et al. | |
| 6,609,717 B2 * | 8/2003 | Hinson | 277/598 |
| 6,669,205 B2 * | 12/2003 | Schenk | 277/628 |
| 6,695,357 B2 | 2/2004 | Schenk et al. | |
| 6,761,360 B2 | 7/2004 | Hammi | |
| 2002/0030326 A1 | 3/2002 | Bettencourt | |
| 2003/0025328 A1 | 2/2003 | Schenk et al. | |
| 2005/0044689 A1 * | 3/2005 | Yetter et al. | 29/469.5 |
| 2006/0005372 A1 * | 1/2006 | Lang | 29/509 |
| 2006/0191137 A1 * | 8/2006 | Walz et al. | 29/888.3 |

FOREIGN PATENT DOCUMENTS

| | | |
|---|---|---|
| EP | WO 96/31724 | 10/1996 |
| JP | 20094045 | 4/2000 |
| JP | 2002192262 A | 7/2002 |

OTHER PUBLICATIONS

Notification of Transmittal of the International Search Report and the Written Opinion of the International Searching Authority, or the Declaration in International Application No. PCT/US2004/024305.

Parker Seals Group Spirotallic® Spiral Wound Gaskets—Copyrighted 1981.

Parker Seals Group Parmite Spirotallic™ Gasket—Copyrighted 1985.

Fluid Sealing Associated Technical Handbook Second Edition, Metallic Gasket Division—Copyrighted 1979.

Earl's Performance Products Pressure Master™ Engine Gaskets Seals, dated 1966.

* cited by examiner

RETAINER GASKET CONSTRUCTION

CROSS REFERENCE TO RELATED CASES

The present application claims the benefit of the filing date of U.S. Provisional Application Ser. No. 60/497,777; filed Aug. 26, 2003, the disclosure of which is expressly incorporated herein by reference.

BACKGROUND OF THE INVENTION

The present invention relates broadly to a sealing construction for providing a fluid seal intermediate a pair of opposed, mating parts or structures, and more particularly to a metal retainer therefor having seal receiving grooves adapted to be fabricated by coining or a like sheet metal stamping or forming process.

In basic construction, gaskets of the type herein involved are formed of one or more resilient sealing elements which are supported by sheet metal plate or other retainer which may be machined, stamped, molded or otherwise formed to conform to the geometry of the mating surfaces to be sealed. Particularly, the seal members may be molded-in-place or otherwise mounted in grooves formed into one or both sides of the retainer. Representative such gaskets are shown, for example, in U.S. Pat. Nos. 3,195,906; 3,215,442; 3,259,404; 3,578,346; 3,635,480; 3,720,420; 3,746,348; 4,026,565; 4,625,978, 5,890,719; 6,460,859; 6,553,664; 6,669,205 and 6,761,360 and in U.S. Pat. Appln. Pub. No. 2003/0025328A1; and US2002/0030326A1, and are marketed commercially by the Composite Sealing Systems Division of Parker-Hannifin Corporation, San Diego, Calif, under the tradenames "Gask-O-Seal."

Retainer gaskets of the type herein involved are employed in a variety of sealing applications, such as in commercial, industrial, or military equipment, vehicles, or aircraft for compression between the opposing or faying surfaces of a pair of mating parts or structures to provide a fluid-tight interface sealing thereof. In service, the gasket is clamped between the mating surfaces to effect the compression and deformation of the seal member and to develop a fluid-tight interface with each of those surfaces. The compressive force may be developed using a circumferentially spaced-apart arrangement of bolts or other fastening members, or by a threaded engagement of the mating parts.

Heretofore, the retainer grooves, which may be single or double-sided or walled, have been formed by machining. As a relatively labor-intensive and slow process, machining thus constitutes a significant expense in the overall cost of the gasket. It is believed, therefore, that lower cost alternatives would be well-received by industry, and particularly for automotive and other high volume applications.

BROAD STATEMENT OF THE INVENTION

The present invention is directed to a retainer gasket construction particularly adapted for high volume applications having complex sealing geometries. The gasket includes a retainer which may be formed of sheet metal or other metal plate, and one or more integral sealing elements supported on the retainer. The retainer is provided in accordance with the precepts of the present invention as having grooves for receiving the seal elements, which grooves are coined or otherwise stamped or sheet-metal formed into the retainer. With the grooves so formed, each of the seal elements may be molded-in-place or otherwise received into a corresponding one of the grooves. The coining of the grooves into the retainer facilitates its construction for automotive and other high volume applications. Such coining, moreover, allows structures, such as pins and slots, to be formed in the retainer in an economical manner.

The present invention, accordingly, comprises the article and method possessing the construction, combination of elements, and arrangement of parts and steps which are exemplified in the detailed disclosure to follow. Advantages of the present invention include a gasket construction which may be adapted for use with various sealing configurations, and particularly multi-port or other complex arrangements. Further advantages include a gasket construction which is economical to manufacture in high volumes. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

Figure 1:
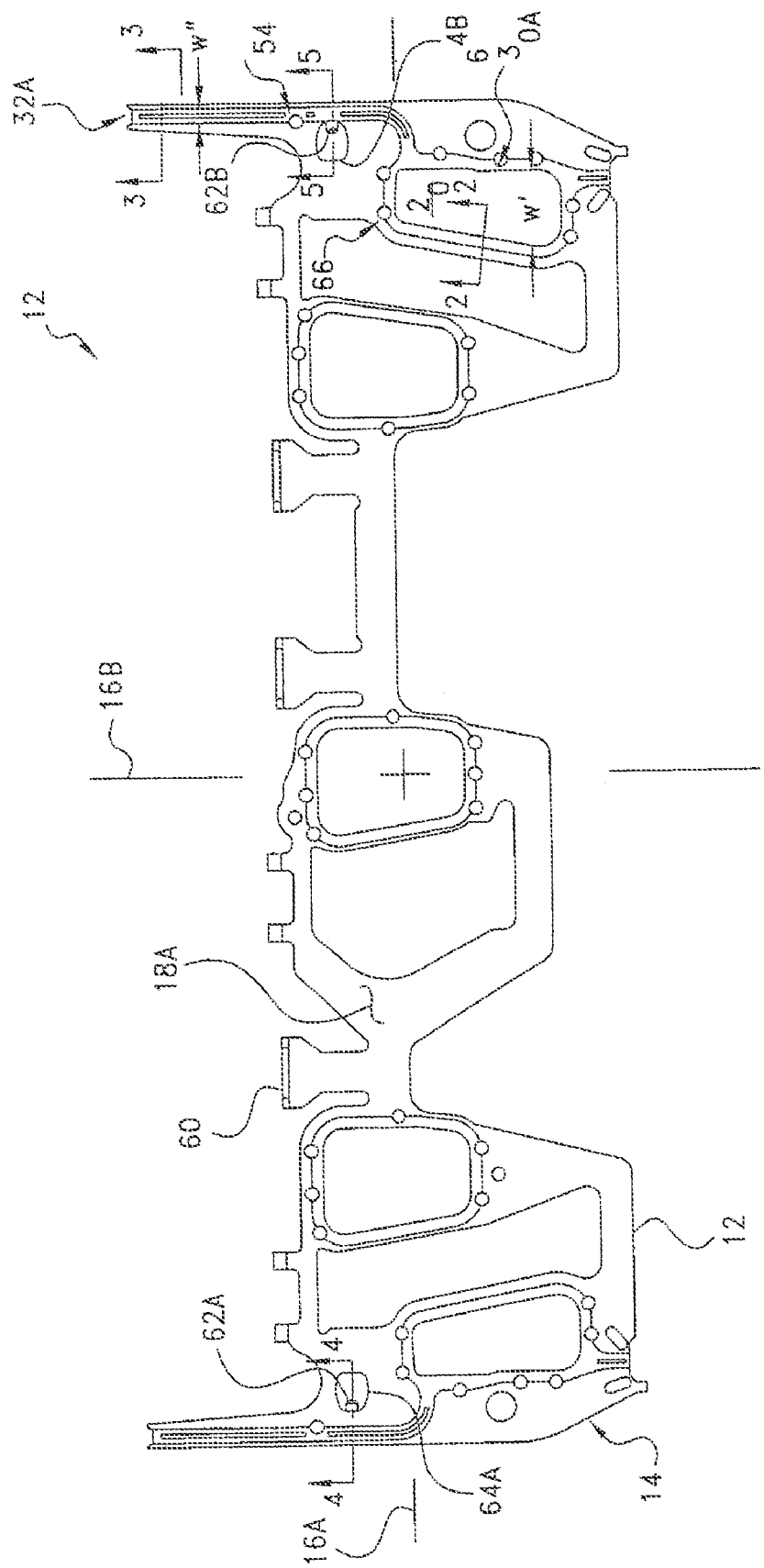
FIG. 1 is a plan view of a representative embodiment of a grooved retainer construction according to the present invention.

The drawings will be described further in connection with the following Detailed Description of the Invention.

DETAILED DESCRIPTION OF THE INVENTION

Certain terminology may be employed in the following description for convenience rather than for any limiting purpose. For example, the terms "forward" and "rearward,"

"front" and "rear," "right" and "left," "upper" and "lower," "top" and "bottom," and "right" and "left" designate directions in the drawings to which reference is made, with the terms "inward," "inner," "interior," "inside," or "inboard" and "outward," "outer," "exterior," "outside," or "outboard" referring, respectively, to directions toward and away from the center of the referenced element, the terms "radial" or "vertical" and "axial" or "horizontal" referring, respectively, to directions, axes, or planes perpendicular and parallel to the longitudinal central axis of the referenced element. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows or underscores.

For the illustrative purposes of the discourse to follow, the precepts of the retainer gasket construction of the present invention are described in connection with the configuration thereof for use as an intake manifold, head gasket, or other multi-port seal within an engine for a motor vehicle. In view of the discourse to follow, however, it will be appreciated that aspects of the present invention may find utility in other fluid sealing applications requiring a flexible gasket of the type herein involved. Use within those such other applications therefore should be considered to be expressly within the scope of the present invention.

Referring then to the figures wherein corresponding reference characters are used to designate corresponding elements throughout the several views with equivalent elements being referenced with prime or sequential alphanumeric designations, shown generally at 12 in the plan view of FIG. 1, with the reverse side in the illustrated embodiment being understood to be substantially the same as the side shown, is a representative embodiment according to the present invention of a generally planar, metal retainer for use in combination with one or more elastomeric seal elements which may be mounted on one or, typically, both sides (see FIG. 2) of the retainer 12 in a retainer gasket construction. Retainer 12 may be configured as shown for interposition between a pair of interfacing surfaces, such as a cylinder head and engine block within an internal combustion engine, as having an outer margin, 14, corresponding to the outer margins of those surfaces. Such outer margin 14 may extend in the radial directions defined by the orthogonal horizontal axes referenced at 16a-b, and, as shown for illustrative purposes, may have a generally irregular shape, but which shape alternatively may be circular, elliptical, polygonal, or otherwise rectilinear depending upon the intended application. The outer margin 14 defines the radial extents of opposing upper, 18a, and lower, 18b (see FIG. 2), radial surfaces. Radial surfaces 18 each may be generally planar or, alternatively, may have one or more degrees of curvature to match the curvature of the corresponding interfacing surfaces to be sealed.

Retainer gaskets of type herein involved are conventionally provided as having one or more openings formed through the radial surfaces thereof, such as for a registration with cylinder bores, bolt holes, coolant or lubrication ports, and other throughbores, passageways, and chambers. In this regard, retainer 12 includes one or more openings, one of which is referenced at 20, formed through the surfaces 18. Each of such openings 20 may be configured for registration with a corresponding bore, passageway, or chamber of the engine. In this regard, it will be appreciated that the arrangement of the openings 20 shown in FIG. 1 to be formed through the retainer member 12 may correspond in number and arrangement to those formed within the interfacing surfaces of the engine components between which the gasket incorporating the retainer 12 is to be interposed.

Figure 2:
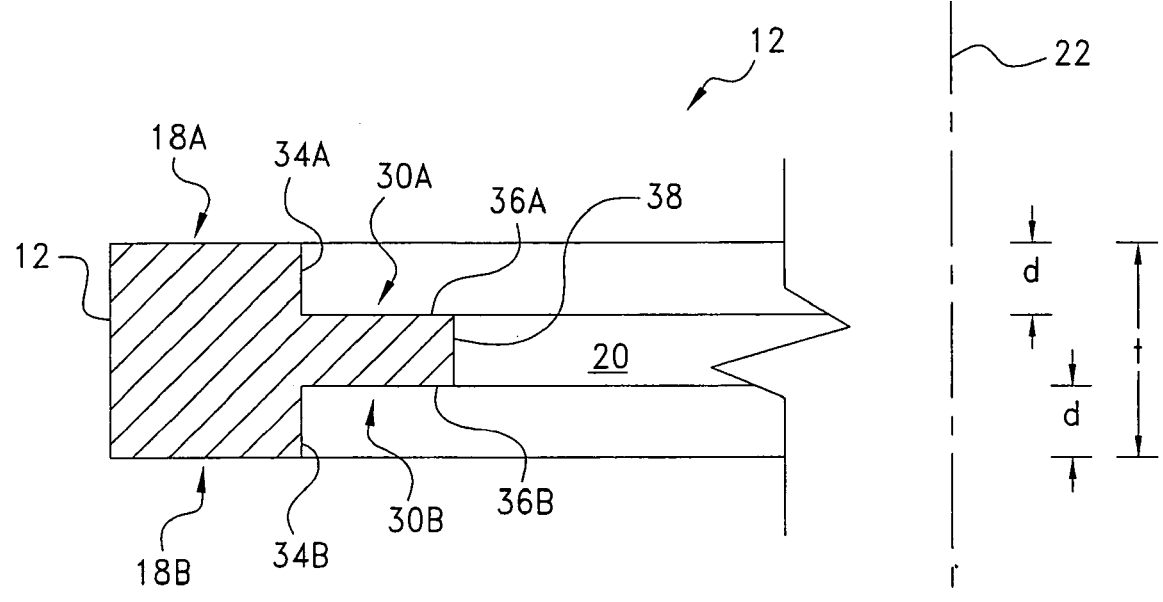
FIG. 2 is an enlarged, fragmentary cross-sectional view of the retainer of FIG. 1 taken through line 2-2 of FIG. 1.

Retainer 12 further has a thickness dimension, referenced at t in the cross-sectional view of FIG. 2, defined intermediate the radial surfaces 18, and through which the which openings 20 extend. Such thickness dimension t itself extends in an axial direction along a vertical axis, referenced at 22 in FIG. 2, which axis and direction are generally normal to the radial direction referenced by the axes 16. Depending upon its material of construction and the intended application, the thickness dimension t may be between about 1/16-1 inch (0.15-2.5 cm), making the retainer 12 generally rigid. Suitable metal materials for the construction of retainer 12 include aluminum, steel, stainless steel, copper, brass, titanium, nickel, and alloys thereof, with aluminum being preferred for many applications. The metal may be anodized, plated, or otherwise treated for increased corrosion resistance.

Figure 3:
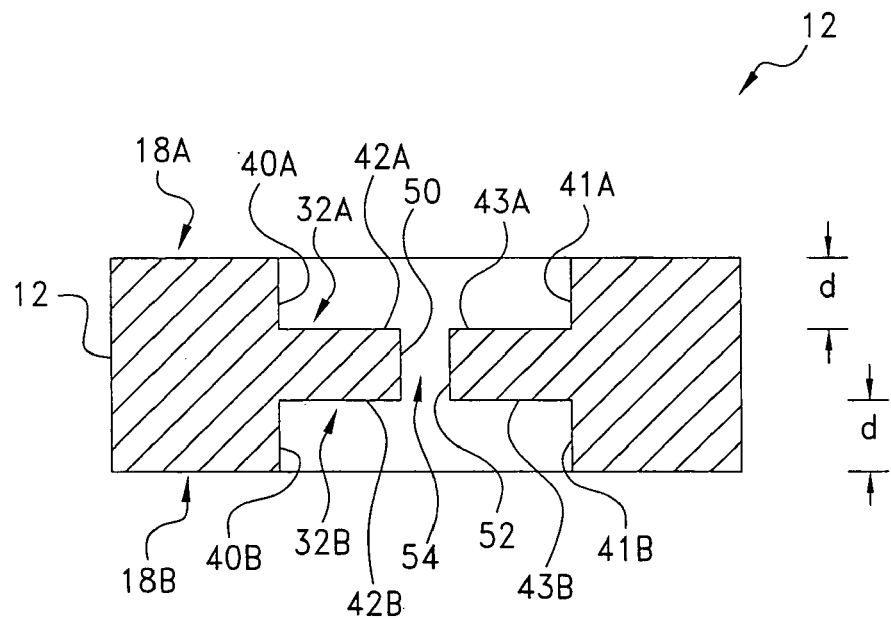
FIG. 3 is an enlarged cross-sectional view of the retainer of FIG. 1 taken through line 3-3 of FIG. 1.

As is shown in FIG. 1 and in the cross-sectional views of FIGS. 2-3, retainer 12 further is provided with one or both of the radial surfaces 18 being formed as having one or more mounting grooves, such as is referenced at 30a and 32a for surface 18a, each of which grooves 30a and 32a typically may have a corresponding groove, such as is referenced at 30b in FIG. 2, and at 32b in FIG. 3, for surface 18b, to thereby define an axially-registered mounting groove pair. As may be seen in FIG. 1, and with additional reference to the cross sectional view of FIG. 2, grooves 30a-b each surround the opening 20 in defining a generally L-shaped channel on the opposite surfaces 18a-b of the retainer 12. Each of the grooves 30a-b has an axial sidewall, 34a-b, respectively, and a radial bottom wall, 36a-b, respectively, which extends radially inwardly from the corresponding sidewall 34a or 34b to a common edge, 38, which defines the perimeter of the opening 20. In this regard, the groove sidewalls 34a-b each define an enclosed geometric shape which may generally correspond to the shape of the opening 20. The groove sidewalls 34a-b also define, relative to the corresponding groove bottom wall 36a-b, a depth, commonly referenced at "d" in FIG. 2, of each groove which may be between about 1/8-1/3 of the axial thickness t.

With continuing reference to FIG. 1, and with additional reference now to the cross-sectional view of FIG. 3, it may be seen that the grooves 32a-b each may extend generally linearly, rectilinearly, or curvilinearly in defining a generally U-shaped channel on the opposite surfaces 18a-b of the retainer 12. Each of the grooves 32a-b, which also may form a closed or, as shown, open geometry, and which, as shown, may be contiguous with another groove such as grooves 30a-b (FIG. 2), has an axial first sidewall 40a-b, respectively, and an opposing, spaced-apart second sidewall, 41a-b. A radial first bottom wall, 42a-b, and second bottom wall, 43a-b, each extends inwardly from a corresponding sidewall 40a-b, or 41a-b, to a pair of opposing edges, 50 and 52, which define a slot or other gap, 54, therebetween. As before, the groove sidewalls 40a-b and 41a-b define, relative to the corresponding groove bottom wall 42a-b or 43a-b, a depth which is again referenced at d in FIG. 3.

Figure 4:
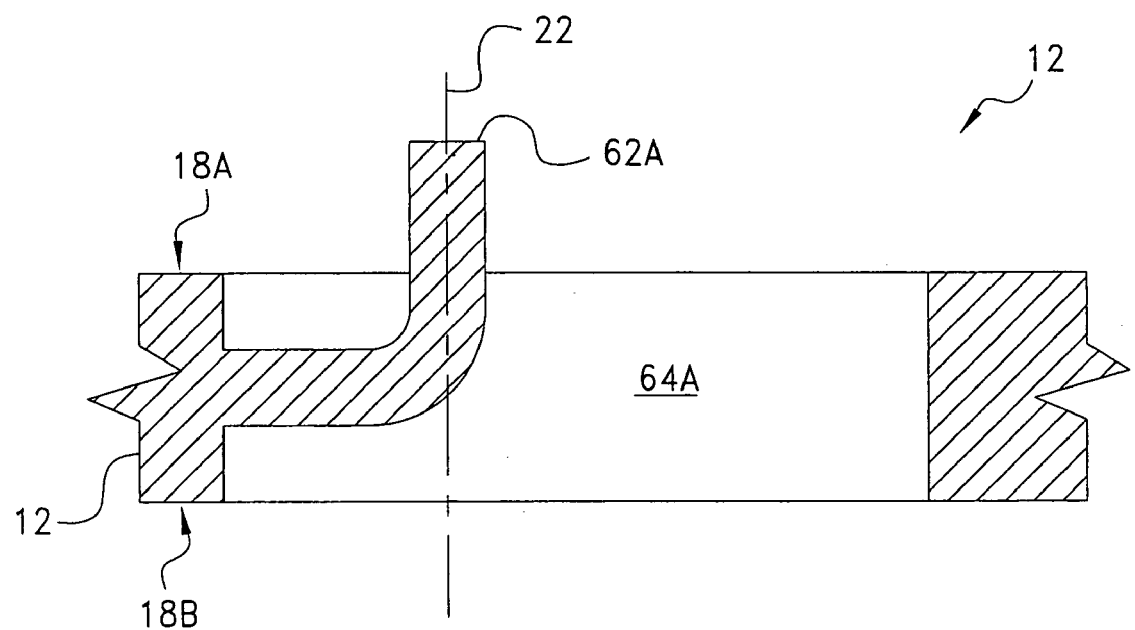
FIG. 4 is an enlarged, fragmentary cross-sectional view of the retainer of FIG. 1 taken through line 4-4 of FIG. 1.
Figure 5:
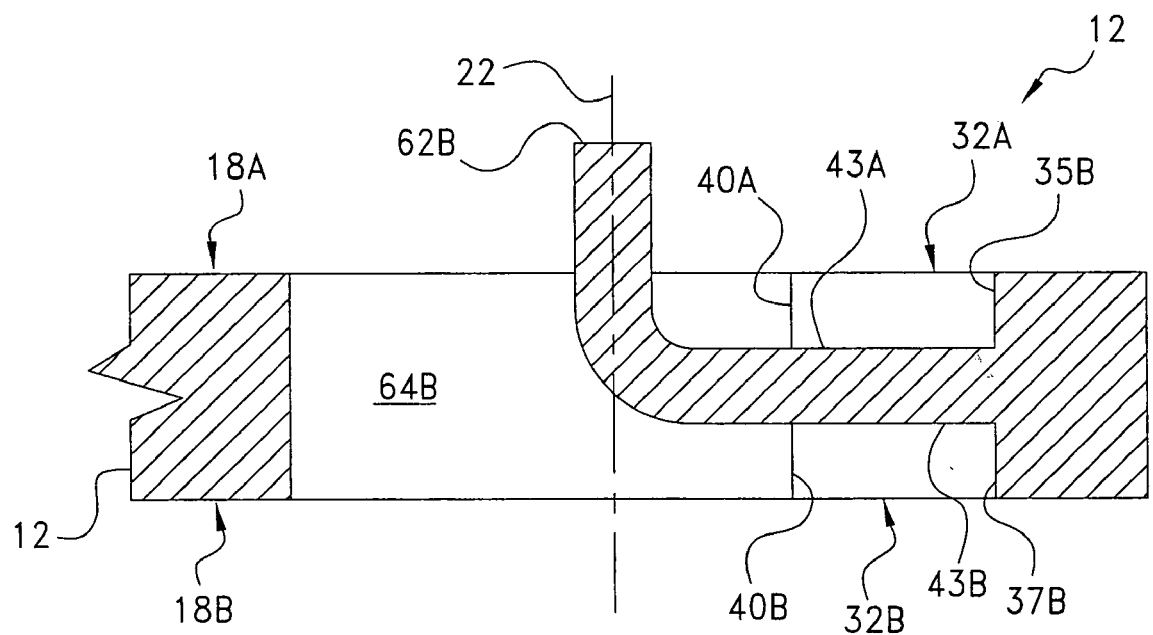
FIG. 5 is an enlarged, fragmentary cross-sectional view of the retainer of FIG. 1 taken through line 5-5 of FIG. 1.

Additional features and structures also may be formed within the retainer 12 as the particular application may require. As is shown, for example, at 60 in FIG. 1, certain sections of the retainer 12 may be bent or otherwise formed into a prong-like feature. Generally upstanding locating pins, as are referenced at 62*a-b*, also may be provided. As may be seen with additional reference to the cross-sectional views of FIGS. 4 and 5, each of the pins 62*a* (FIG. 4) and 62*b* (FIG. 5) may be provided to extend inwardly from the margin of a corresponding hole, 64*a-b*, and thereupon may be bent or otherwise formed to extend upwardly relative to the one of the surfaces 18*a-b*. As may be seen in FIG. 5 for pin 62*b*, the pin itself may be contiguous with the grooves 32*a-b* in extending generally coplanarly from the bottom walls thereof. One or more other holes may be formed through the outer margins of the grooves, such as is shown at 66 in FIG. 1 for the grooves 30*a-b*.

Figure 6A:
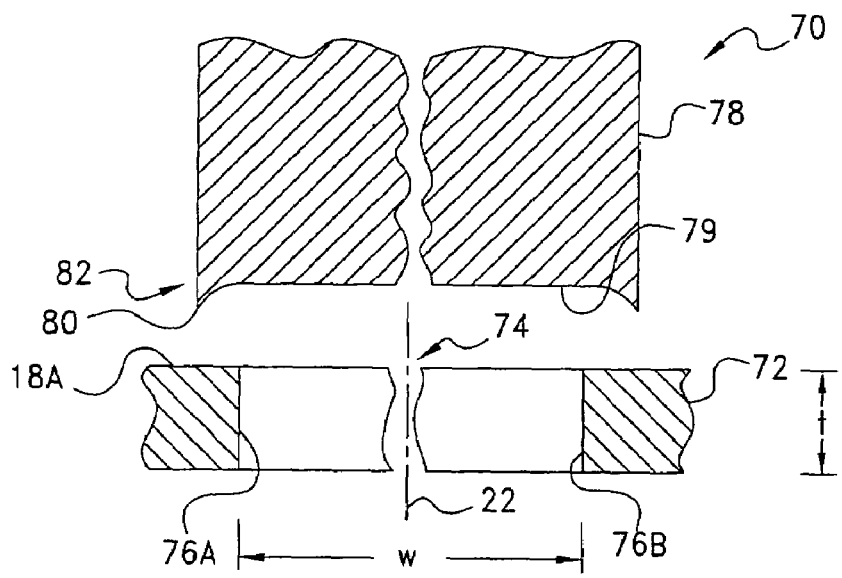
FIG. 6A is a cross-sectional, somewhat schematic and fragmentary view illustrative of a coining operation in accordance with the present invention for forming the grooves of the retainer of FIG. 1, the method commencing with the provision of a punch.
Figure 6B:
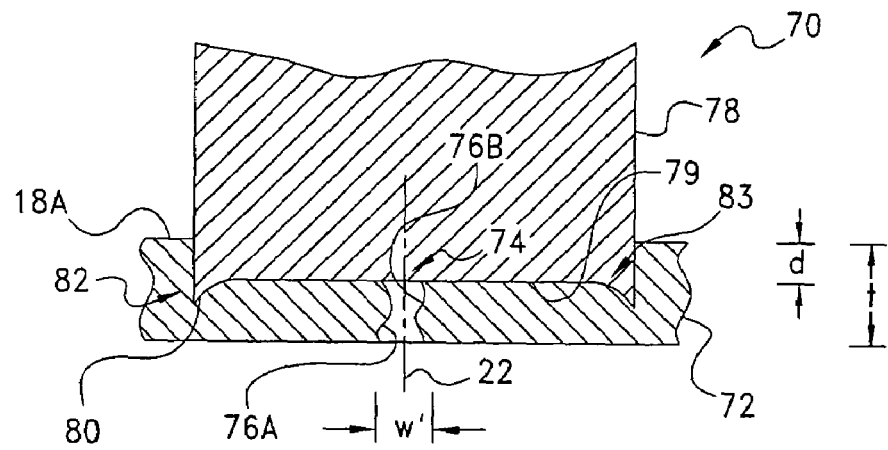
FIG. 6B is a view as in FIG. 6B showing the coining operation continuing with the striking of a surface of a blank with the punch.
Figure 6C:
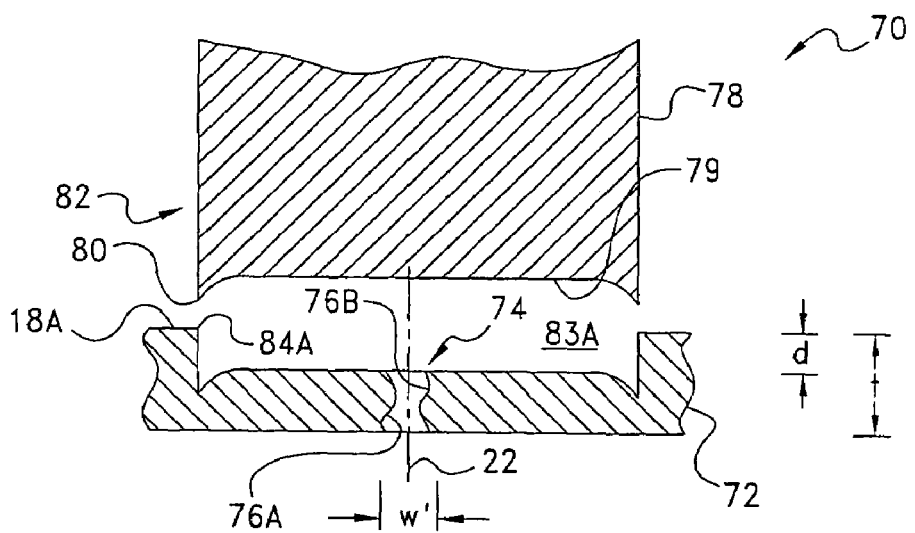
FIG. 6C is a view as in FIG. 6C showing the completion of the coining operation.

In accordance with the present invention, one or more, or all of the grooves 30*a-b* and 32*a-b* may be formed by coining or a like sheet metal stamping or forming process. With reference now to FIGS. 6A-6C, wherein a somewhat schematic and fragmentary illustration of a representative coining process in accordance with the present invention is shown generally at 70, such process 70 commences in FIG. 6A with the provision of retainer 12 as a blank or slug, 72, having a slot, hole, or other opening, represented in a fragmentary fashion at 74 to indicate an arbitrary widthwise extent, formed through the thickness dimension t thereof. Such opening 74, having an edge or edges, 76*a-b*, as the case may be, may correspond to one of the openings 20 or slot 54 (FIG. 1), but as having a widthwise extent, referenced at "w." Such extent will be marginally, i.e., about 25-90%, larger than the final corresponding widthwise, i.e., radial extent of the opening or slot, such as is referenced at w' in FIG. 1 for opening 20, and at w'' for slot 54.

A punch, represented at 78 in FIG. 6A in a fragmentary fashion to again illustrate an arbitrary widthwise or diametric extent which generally will be dependent upon the widthwise extent w of the opening 74, also is provided in the process 70 as having a geometric shape which may be generally cylindrical, blade-like, or otherwise corresponding to the shape of the groove 30*a-b* or 32*a-b*, as the case may be (FIGS. 1-3). Punch 78 further has a punch surface, 79, which confronts the surface 18*a* of the blank 72. Such surface 79 further may be configured in accordance with the present invention as having a projection, 80, which may extend continuously or substantially continuously along the outer perimeter, 82, of the punch 78, or as otherwise substantially corresponding to the shape of the groove 30 or 32. With the punch 78 being so provided, and with the projection overlapping the edge or edges 76*a-b*, the punch 78 may be driven, as may be seen proceeding to FIG. 6B, to contact the surface 18*a* at a given pressure to thereby impart the impression, 83*a*, of the groove 30*a* or 32*a* therein.

As may be seen with reference now to FIG. 6C wherein punch 78 is shown as having been retracted, such contact causes an axial displacement or upset in the thickness of the metal material forming the blank, with a corresponding radial inward flow of the material and resultant reduction in the widthwise extent w, to w', of the opening 74, as such opening is continued to be defined between the edges 76*a-b*. Depending upon the tolerance required, the inner diameter of opening 74 may be further sized such as by shearing or machining. Although for most applications the edge or edges will be non-touching or otherwise open, it is to be considered within the scope of the invention herein involved that such edge or edges may be touching or otherwise closed by the coining process. It has been observed that the provision of the projection 80 advantageously functions to confine the flow of the upset material, with the result that the groove impression 83*a* so formed may have sharp, i.e., substantially 90° or otherwise well-defined, edge, such as is referenced at 84*a* in FIG. 6C. The pins 62 also may be formed by such coining process, but as may utilize a generally flat punch to strike a tab-like process which may be provided to extend inwardly from the margin of a corresponding hole 64*a-b* (FIG. 1).

Figure 6D:
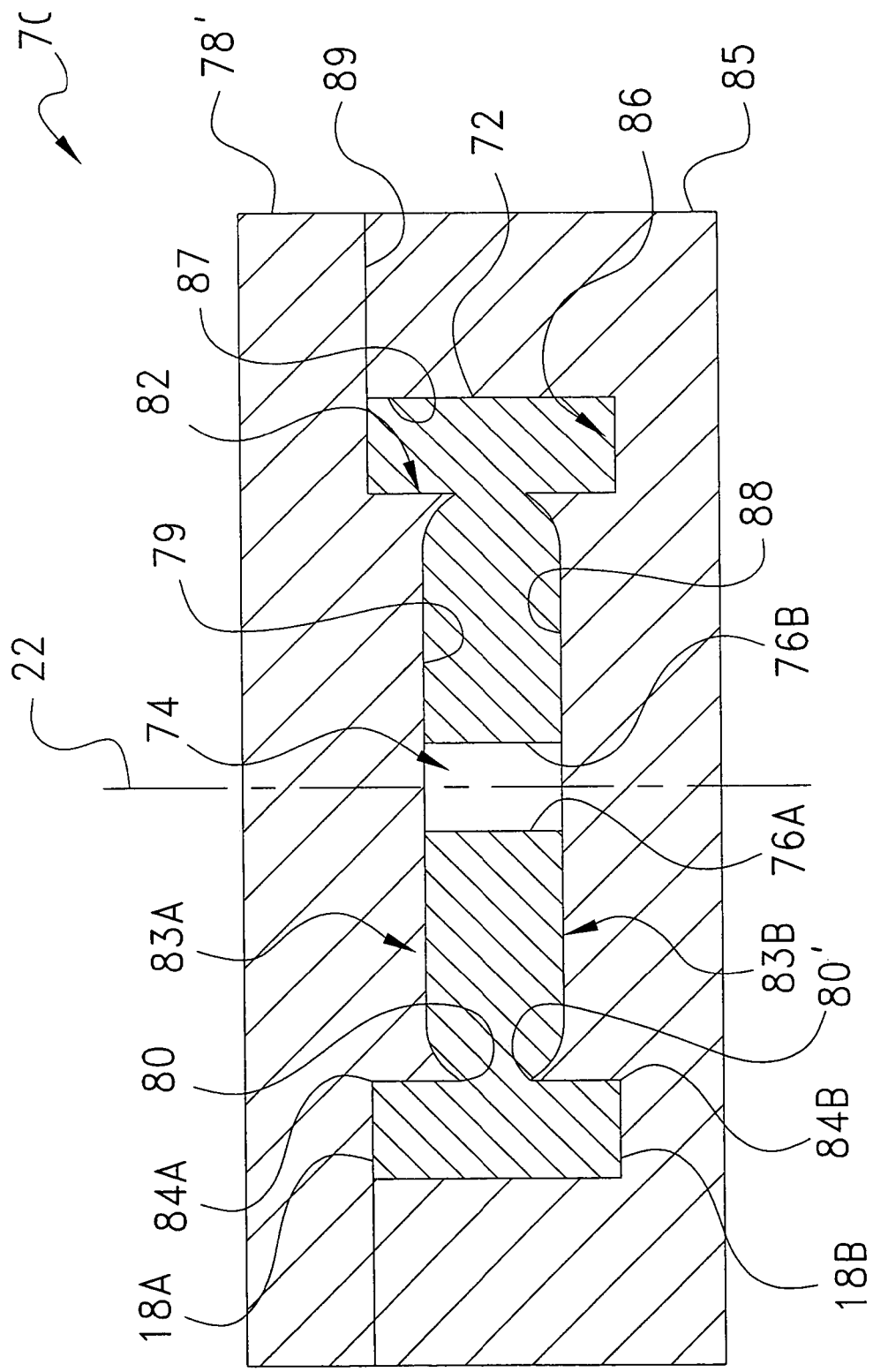
FIG. 6D is a view as in FIG. 6B showing an alternative coining operation for forming the grooves of the retainer of FIG. 1.

Looking next to FIG. 6D, an alternative coining operating in accordance with the present invention for forming the grooves 30*a-b* and 32*a-b* is shown generally at 70'. Such process is performed generally as was described in connection with FIGS. 6A-C, but as additionally utilizing a die, 85, for use in conjunction with the punch, now referenced at 78'. Die 85 is formed as having a cavity, 86, within which the blank 72, or a section thereof, may be received. As shown in FIG. 6D, cavity 86 may be configured as having a sidewall or walls, 87, and as having an upstanding die surface, 88. Die surface 88 may be the mirror of the punch surface 79', and in that regard may its own projection, referenced at 80'.

In the closed orientation shown in FIG. 6D, the punch 78' and die 88 meet along the line shown at 89, and thereby contain the blank 72. In this regard, the outward flow of the blank material may be retained by the sidewall 87 to thereby hold the perimeter geometry of the part so formed to a given tolerance. Such retention may be especially desirable in the narrow areas such as shown in FIG. 3 wherein the groove walls 40 and 41 and not backed by a relative large mass of material. At the same time, the contact of the die surface 88 on the blank surface 18*b* may impart the impression 83*b* of the groove 30*b* or 32*b* therein, such impression again having a well-defined edge, 84*b*. In the event that the part geometry precludes the use of the sidewalls 87, the opening, as before, may be further formed to size by shearing, machining, or other secondary operation.

In the commercial manufacture of the retainer 12, such retainer may be fabricated in a multi-station, progressive die operation or, alternatively, using separate dies in a transfer press operation. In such operation, the retainer 12 first may be provided as a piece of generally flat metal plate or sheet stock which, in the various die stations or dies, may be stamped, bent, and coined to form the final configuration of the retainer 12.

Figure 7:
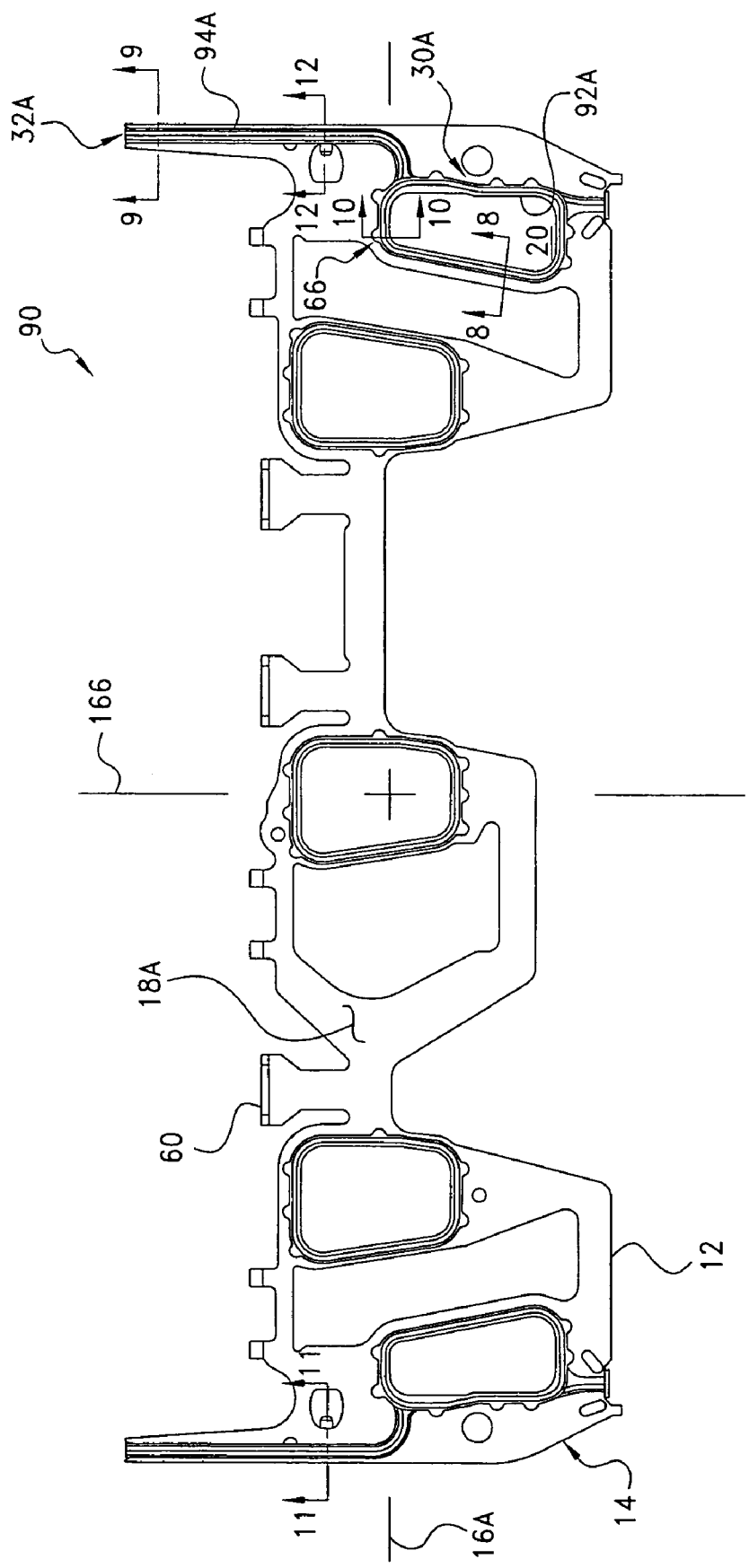
FIG. 7 is a plan view of a representative embodiment of a gasket construction according to the present invention which incorporates the retainer of FIG. 1.

Turning now to FIG. 7, retainer 12 reappears as incorporated within a metal and elastomer gasket construction, 90, according to the present invention. In this regard, with retainer 12 being formed as described in connection with FIGS. 6A-6C, various seal elements, two of which are referenced at 92*a* and 94*a*, may be molded, bonded, or otherwise attached thereto as a continuous ring or length of an elastomeric material to complete the construction of the gasket 90.

Figure 8:
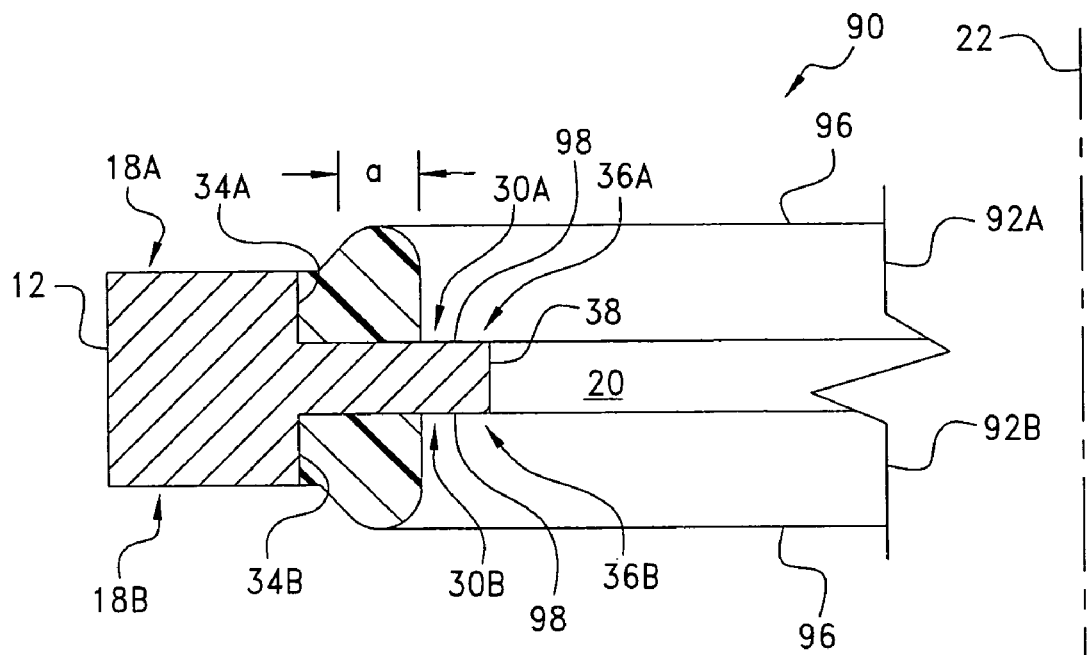
FIG. 8 is an enlarged, fragmentary cross-sectional view of the gasket of FIG. 7 taken through line 8-8 of FIG. 7.
Figure 9:
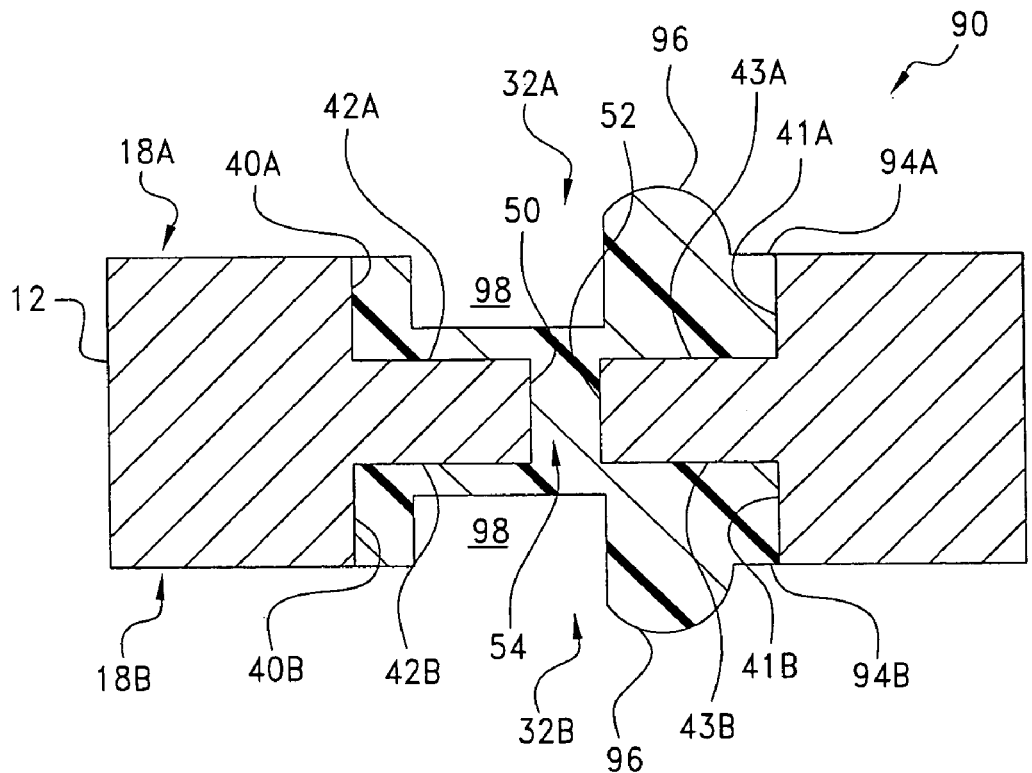
FIG. 9 is an enlarged cross-sectional view of the gasket of FIG. 7 taken through line 9-9 of FIG. 7.

In the illustrated configuration of FIG. 7, and as may be seen in the cross-sectional views of FIGS. 8-9, each of these seal elements 92*a* and 94*a* located on the surface 18*a*, as well as the corresponding elements 92*b* and 94*b* which may be located on the surface 18*b*, may be received with a corresponding groove 30*a-b* or 32*a-b* as having a bead or lobe portion, commonly referenced at 96. Each of the bead portions 96 may be contactible by one of the interface surfaces (not shown) between which the gasket 90 may be interposed for the axial sealing compression of the seal elements 92 and 94 within the intended application.

In this regard, depending upon the location of such interface surface relative to the gasket 10, each of the bead portions 60 may be spaced-apart from a corresponding sidewall 34*a-b*, 40*a-b*, or 41*a-b*, or, alternatively and such as is shown in FIG. 9 for seal elements 94*a-b*, as oriented to one or the other side so as to define an annular gap, commonly referenced at 98, with the opposing edge, such as is shown in FIG. 8 for the single-sided grooves 30a-b, or with the opposing sidewall, such as is shown in FIG. 9 for the double-side grooves 32a-b. Bead portions 96 may be of any radial size, but typically will have a width, referenced at "a" in FIG. 8, which, depending upon the size of the groove, may be between about 0.030-0.200 inch (0.75-5.08 mm).

Within pair of corresponding grooves 30 or 32, each of the bead portions 96 present oppositely disposed, generally hemispherical bearing surfaces which in the illustrated embodiment define radial seals on one or both sides 18 for the gasket 90. As may be seen in FIG. 7 for surface 18a, such sealing surfaces extend along the generally circular geometry of the opening 20 for coaxial registration with the margins of the interface surfaces which may surround, for example, a fluid flow passageway or chamber. It will be appreciated, however, that different and/or independent geometries of seal elements 92 and 94 may be envisioned depending upon the configuration of the corresponding passageway or chamber, and/or of the interfacing surfaces within the intended application.

For the axial compression of the seal elements 92 and 94 by the interface surfaces effecting a fluid-tight seal therewith, the bead portions 96 thereof may be provided, again as depending upon the geometry of the interface surfaces, to extend axially beyond the corresponding radial surface 18 of retainer 12 for abutting contact with a corresponding one of the interface surfaces. That is, bead portions 60 may be provided, as is shown in FIGS. 8-9 to protrude between about 1-100 mils (0.025-2.5 mm) beyond the corresponding radial surface 18, with the gap portions 98 being provided to accommodate the deformation of the bead portions 96 such that the surfaces thereof each may lie coplanarly with a corresponding one of the retainer surfaces 18 when the seal elements 92 and 94 are energized between the interface surfaces. Bead portions 96 may be single as shown or, alternatively, double to provided redundant sealing surfaces for each of the interface surfaces.

With retainer 12 being provided as has been described, each of the seal elements 92 and 94 may be adhesively bonded, interference fit or, preferably, molded, or otherwise within a corresponding one of the grooves 30 or 32 as continuous or discontinuous, i.e., segmented, ring or length of an elastomeric material. For the attachment of the seal elements 92 and 94 within the grooves 30 and 32, the groove wall surfaces may be primed with a siloxane, silane, or other bonding agent. The primed retainer 12 then may be placed into a heated molded cavity for the injection, compression, or transfer molding of an uncured rubber or other elastomeric compound forming the integral seal elements. Each of the seal elements thereby may be formed and cured-in-place as vulcanized directly onto retainer 12. Alternatively, the elastomeric elements may be molded in a separate operation and otherwise bonded using an adhesive or interference fit into a groove 30 or 32.

Figure 10:
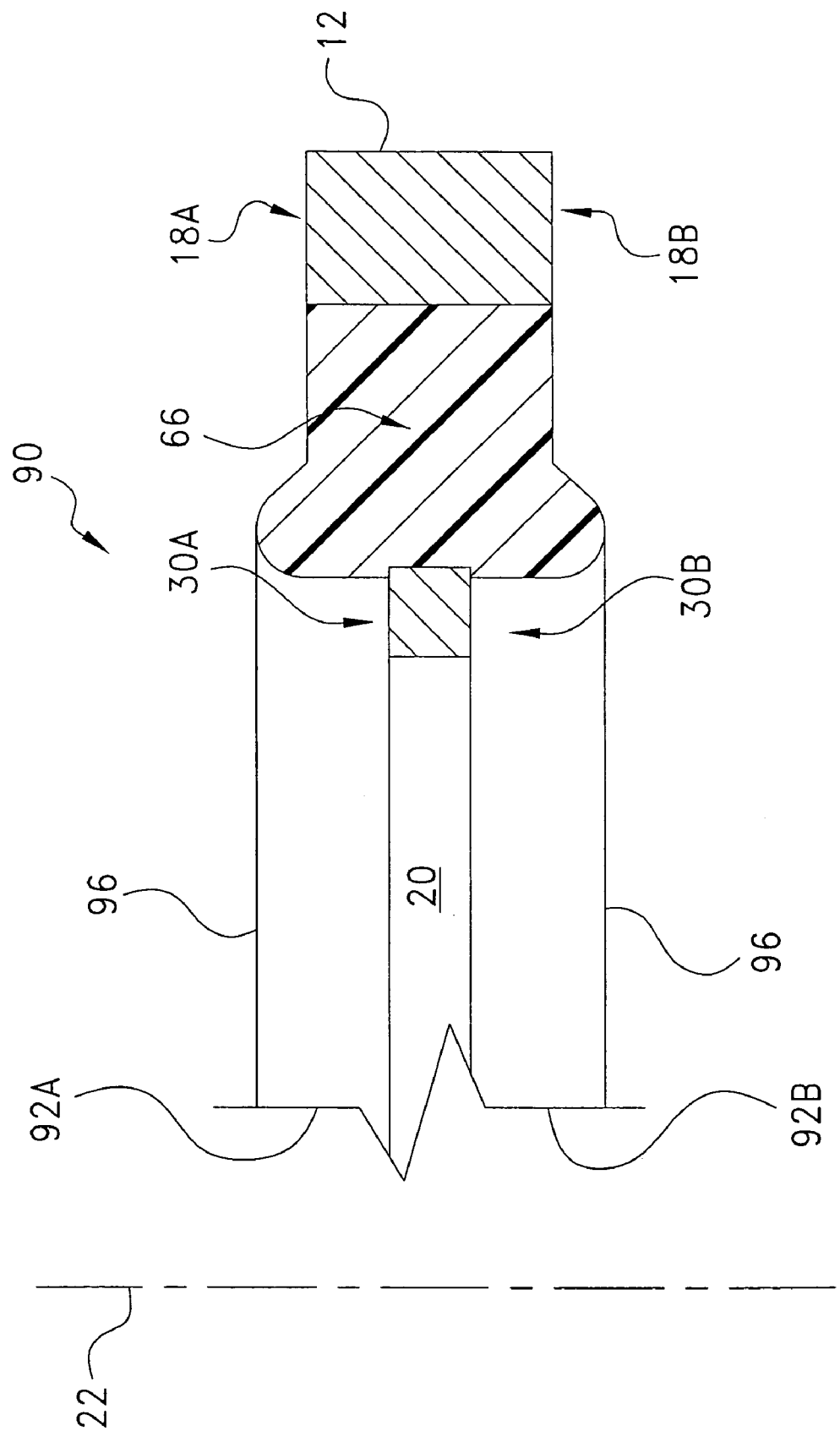
FIG. 10 is an enlarged, fragmentary cross-sectional view of the gasket of FIG. 7 taken through line 10-10 of FIG. 7.

The seal elements 92 and 94 also may be mechanically locked onto the retainer 12, such as by virtue of the elastomeric material being injected or otherwise being flowed through the slot 54 to integrally join the element 94a to the element 94b in the manner shown in FIG. 9. Similarly, and as is shown in FIG. 10, material may be injected or otherwise flowed through the holes 66 to integral join the seal element 92a to the element 92b.

Seal elements 92 and 94 may be formed of a synthetic rubber which specifically may be selected for high temperature performance or otherwise for compatibility with the fluid being handled. Suitable materials include natural rubbers such as Hevea, as well as thermoplastic, i.e., melt-processible, or thermosetting, i.e., vulcanizable, synthetic rubbers such as fluoropolymers, chlorosulfonate, polybutadiene, polybutadiene, buna-N, butyl, neoprene, nitrile, polyisoprene, silicone, fluorosilicone, copolymer rubbers such as ethylene-propylene (EPR), ethylene-propylene-diene monomer (EPDM), nitrile-butadiene (NBR) and styrene-butadiene (SBR), or blends such as ethylene or propylene-EPDM, EPR, or NBR. The term "synthetic rubbers" also should be understood to encompass materials which alternatively may be classified broadly as thermoplastic or thermosetting elastomers such as polyurethanes, silicones, fluorosilicones, styrene-isoprene-styrene (SIS), and styrene-butadiene-styrene (SBS), as well as other polymers which exhibit rubber-like properties such as plasticized nylons, polyesters, ethylene vinyl acetates, and polyvinyl chlorides. As used herein, the term "elastomeric" is ascribed its conventional meaning of exhibiting rubber-like properties of compliancy, resiliency or compression deflection, low compression set, flexibility, and an ability to recover after deformation, i.e., stress relaxation.

Advantageously, seal elements 92 and 94 exhibit a reduced yield stress as compared to retainer 12 and, accordingly, are deformable for conforming to irregularities existing between the interface surfaces within the intended application. Further in this regard, as given compressive load is applied to the seal elements 92 and 94, an increased bearing stress is provided thereon by virtue of the reduced surface area contact of the bearing surfaces of the bead portions 96 on the interface surfaces. This increased stress generally will be sufficient to exceed the reduced yield stress of the seal elements 92 and 94 for the deformation thereof effecting the fluid-tight sealing of the interfacing surfaces. Indeed, the seal elements may be used to effect a hermetic seal which is especially useful in petrochemical and other applications to control the fugitive emission of VOC's and other pollutants.

In service, it will be observed that the combination of a relatively incompressible retainer 12 and the relatively compressible seal elements 92 and 94 provides a gasket construction which minimizes torque loss and thereby obviates much of the need for the periodic re-torquing of the members being joined. That is, it is well-known that gaskets of the type herein involved may develop a compression set which is manifested by fluid leaks as the tension in the joint is relaxed and the fluid-tight sealing of the interfacing surfaces is compromised. In this regard, the provision of bead portions 96 better ensures positive sealing, with retainer 12, in turn, synergistically providing generally a compression stop and non-yielding contact in establishing an alternative load torque path minimizing the compression set and leak potential of the gasket 90. Thus, the use of a retainer allows the mating parts to bear stress loads which otherwise would cause the deformation or extrusion of a gasket which lacked a retainer. In the case of a metal retainer 12, such contact additionally affords improved heat transfer between the interface surfaces, and also develops relatively high seal stresses for assured fluid-tight sealing of the interfacing structures.

Figure 11:
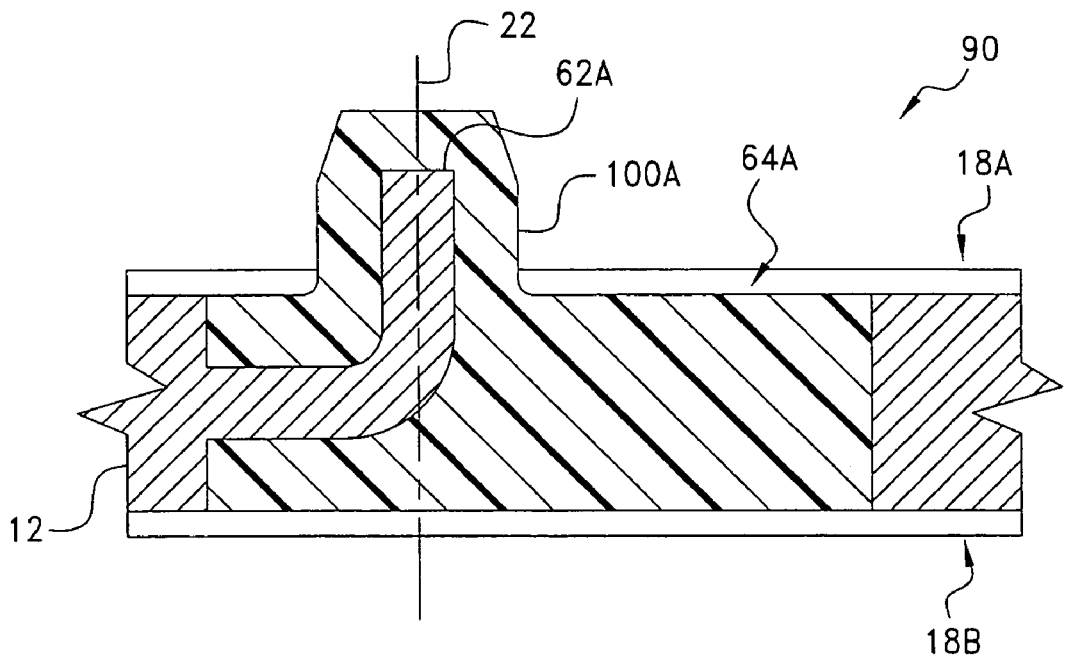
FIG. 11 is an enlarged, fragmentary cross-sectional view of the gasket of FIG. 7 taken through line 11-11 of FIG. 7.
Figure 12:
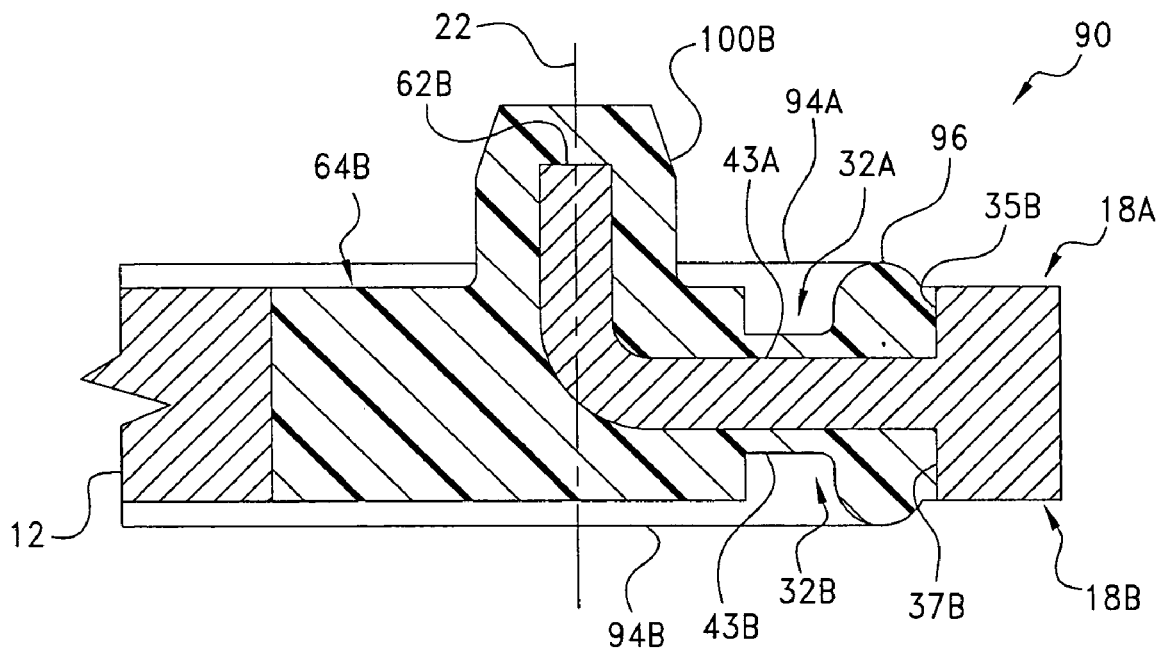
FIG. 12 is an enlarged, fragmentary cross-sectional view of the gasket of FIG. 7 taken through line 12-12 of FIG. 7.

Additional features and structures such as the pins 62 also may be formed by overmolding of the same or different elastomeric or other polymeric material as the seal elements 92 and 94. As may be seen in FIGS. 11 and 12, such elastomeric or other material may encase the retainer pin 62a (FIG. 11) and 62b (FIG. 12) which features thereby may finction as reinforcements for the pin structures 100a (FIG. 11) and 100b (FIG. 12) so formed. As is shown in FIG. 12, the elastomeric material forming the pin structure 100b may be formed integrally with the material forming the seal elements 94a-b.

Thus, a unique gasket construction for automotive and other commercial, industrial, or military applications is described which is economical to manufacture even in complex shapes, and which exhibits reliable sealing properties.

As it is anticipated that certain changes may be made in the present invention without departing from the precepts herein involved, it is intended that all matter contained in the foregoing description shall be interpreted in as illustrative rather than in a limiting sense. All references including any priority documents cited herein are expressly incorporated by reference.

What is claimed is:

1. A method of making a sealing gasket of a variety which includes a retainer having a first groove, and a resilient seal element formed of an elastomeric material which is received within the first groove, the first groove having a first bottom wall and a first sidewall which adjoins the first bottom wall, the method comprising the steps of:
   (a) providing a retainer blank formed of a metal material, the blank having opposing surfaces which define in an axial direction a thickness dimension of the blank therebetween, each of the opposing blank surfaces extending in a radial direction generally normal to the axial direction, and the blank being provided as further having a tab-like process formed through the first and the second surface;
   (b) disposing a first punch over a first one of the blank surfaces, the first punch having a first punch surface confronting the first one of the blank surfaces;
   (c) moving the first punch in the axial direction towards the first one of the blank surfaces; and
   (d) contacting the first one of the blank surfaces with the first punch surface, such contact being effected at a pressure sufficient to impart the impression of the first side and bottom walls of the first groove in the first one of the blank surfaces, wherein the method further comprises the additional steps after step (a) of:
   disposing a second punch over the process, the second punch confronting one of the first and second surfaces;
   moving the second punch in the axial direction towards the confronted one of the first and second surfaces;
   contacting the confronted one of the first and second surface with the second punch surface, such contact being effected at a pressure sufficient to impart the impression of a pin within the thickness dimension of the blank; and
   bending the pin such that the pin is disposed upstandingly relative to one of the first and second surfaces.

2. The method of claim 1 wherein:
   the surfaces of the blank provided in step (a) extend in the radial direction to a first edge;
   the first punch surface has a perimeter which laterally overlaps the first edge when the first punch is disposed in step (b) over the first one of the blank surfaces; and
   such contact in step (d) causes metal material bounded by the perimeter of the first punch surface to be displaced in the axial dimension and to flow in the radial direction towards the first edge.

3. The method of claim 2 wherein:
   the first edge of the blank provided in step (a) defines a widthwise extent of an opening of the blank; and
   such flow in the radial direction of step (d) effects a displacement of the first edge in the radial direction and a corresponding reduction in the widthwise extent of the opening.

4. The method of claim 3 wherein the first edge of the blank provided in step (a) extends radially to define the opening as having a generally closed geometry.

5. The method of claim 3 wherein:
   the widthwise extent of the opening of the blank of step (a) is defined between the first edge and an opposing second edge;
   the perimeter of the first punch surface further laterally overlaps the second edge when the first punch is disposed in step (b) over the first one of the blank surfaces; and
   such contact of step (d) imparts the impression of a second sidewall of the first groove opposite the first side wall, and a second bottom wall of the first groove adjoining the second side wall.

6. The method of claim 5 wherein the second bottom wall of the first groove formed in step (d) adjoins the first bottom wall to thereby close the opening.

7. The method of claim 5 wherein the first and the second edge of the blank provided in step (a) each extends radially to define the first groove as having one or more of a generally linear, rectilinear, or curvilinear geometry.

8. The method of claim 2 wherein the surface of the first punch provided in step (b) is configured as having a projection extending therefrom in the axial direction towards the first one of the blank surfaces, the projection defining at least a portion of the perimeter of the first punch surface.

9. The method of claim 1 further comprising the step:
   (e) receiving the seal member within the first groove.

10. The method of claim 9 wherein the seal element is received within the first groove in step (c) by being molded-in-place therein.

11. The method of claim 9 wherein the seal element is formed of a elastomeric material is a natural or and synthetic rubber.

12. The method of claim 1 wherein the metal material forming the blank of step (a) is selected from the group consisting of aluminum, steel, stainless steel, copper, brass, titanium, nickel, and alloys and combinations thereof.

13. The method of claim 1 further comprising the additional step of overmolding a polymeric material on the pin.

14. The method of claim 1 wherein the tab-like process is formed contiguous with the first groove.

15. The method of claim 1 comprising the step prior to step (c) of:
   receiving the blank within the cavity of a die, the die having a die surface confronting a second one of the blank surfaces,
   wherein the second one of the blank surfaces is contacted in step (d) by the die surface, such contact being effected at a pressure surface to impart the impression of a second groove opposite the first groove in the second one of the blank surfaces.

16. The method of claim 15 wherein:
   the surfaces of the blank provided in step (a) extend in the radial direction to a first edge;
   the die surface has a perimeter which laterally overlaps the first edge; and
   such contact in step (d) causes metal material bounded by the perimeter of the die surface to be displaced in the axial dimension and to flow in the radial direction towards the first edge.

17. The method of claim 16 wherein the die surface is configured as having a projection extending therefrom in the axial direction towards the second one of the blank surfaces, the projection defining at least a portion of the perimeter of the die surface.

* * * * *